(12) United States Patent
Guggisberg et al.

(10) Patent No.: US 11,092,612 B2
(45) Date of Patent: Aug. 17, 2021

(54) VESSEL DISPENSING SYSTEM

(71) Applicant: Roche Diagnostics Operations, Inc., Indianapolis, IN (US)

(72) Inventors: Thomas Guggisberg, Boswil (CH); Christian Marty, Oberiberg (CH); Jan Simon Portmann, Lucerne (CH); Gottlieb Schacher, Grosswangen (CH); Rolf Schneebeli, Mettmenstetten (CH); Markus Troxler, Hildisrieden (CH); Beat Rene Widmer, Steinhausen (CH); Urs Wittenwiler, Unteraegeri (CH)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 315 days.

(21) Appl. No.: 16/426,723

(22) Filed: May 30, 2019

(65) Prior Publication Data
US 2019/0376992 A1 Dec. 12, 2019

(30) Foreign Application Priority Data

Jun. 8, 2018 (EP) ...................................... 8176773

(51) Int. Cl.
*G01N 35/02* (2006.01)
*G01N 35/04* (2006.01)
(Continued)

(52) U.S. Cl.
CPC ........... *G01N 35/025* (2013.01); *G01N 35/04* (2013.01); *B65G 59/062* (2013.01);
(Continued)

(58) Field of Classification Search
CPC ................. G01N 35/025; G01N 35/04; G01N 2035/0441; G01N 2035/0486;
(Continued)

(56) References Cited

U.S. PATENT DOCUMENTS 3,592,355 A * 7/1971 Manzer ................... G07F 13/10
221/11
6,117,391 A 9/2000 Mootz et al.
(Continued)

*Primary Examiner* — Jill A Warden
*Assistant Examiner* — John McGuirk
(74) *Attorney, Agent, or Firm* — Roche Diagnostics Operations, Inc.

(57) ABSTRACT

A system for dispensing vessels to an analyzer is disclosed. The system comprises a disc rotatable about an axis and comprising a groove, a drum arranged above and coupled to the disc to rotatable together about the axis, the drum comprising slots arranged along and around the axis, each slot comprising an input interface for stacking vessels in the slot and an output interface for dispensing the vessels, the output interface comprising a retainer, a crank translatable in a linear forwards and backwards direction orthogonal to the axis between a first, second, and third position. The crank comprises a pin for rotating the disc and bringing a slot into a dispensing position upon translation between the first and second position, the crank comprising an actuator pin for actuating the retainer in the dispensing position upon translation of the crank between the second and third position to dispense the vessels.

14 Claims, 9 Drawing Sheets

(51) Int. Cl.
   *B65G 59/10* (2006.01)
   *B65G 59/06* (2006.01)
(52) U.S. Cl.
   CPC .......... *B65G 59/066* (2013.01); *B65G 59/105* (2013.01); *G01N 2035/0406* (2013.01); *G01N 2035/0441* (2013.01); *G01N 2035/0486* (2013.01)
(58) Field of Classification Search
   CPC ... G01N 2035/0465; G01N 2035/0427; G01N 2035/0425; G01N 2035/0406; B65G 59/062; B65G 59/066; B65G 59/105
   See application file for complete search history.

(56) References Cited

U.S. PATENT DOCUMENTS

| | | | |
|---|---|---|---|
| 7,422,128 B1* | 9/2008 | Cline | G07F 11/54 |
| | | | 221/119 |
| 9,250,256 B2 | 2/2016 | Lukhaub et al. | |
| 10,339,748 B1* | 7/2019 | Chang | G07F 11/56 |
| 2003/0175156 A1 | 9/2003 | Ford | |
| 2008/0193332 A1* | 8/2008 | Talmer | B01L 9/06 |
| | | | 422/63 |

\* cited by examiner

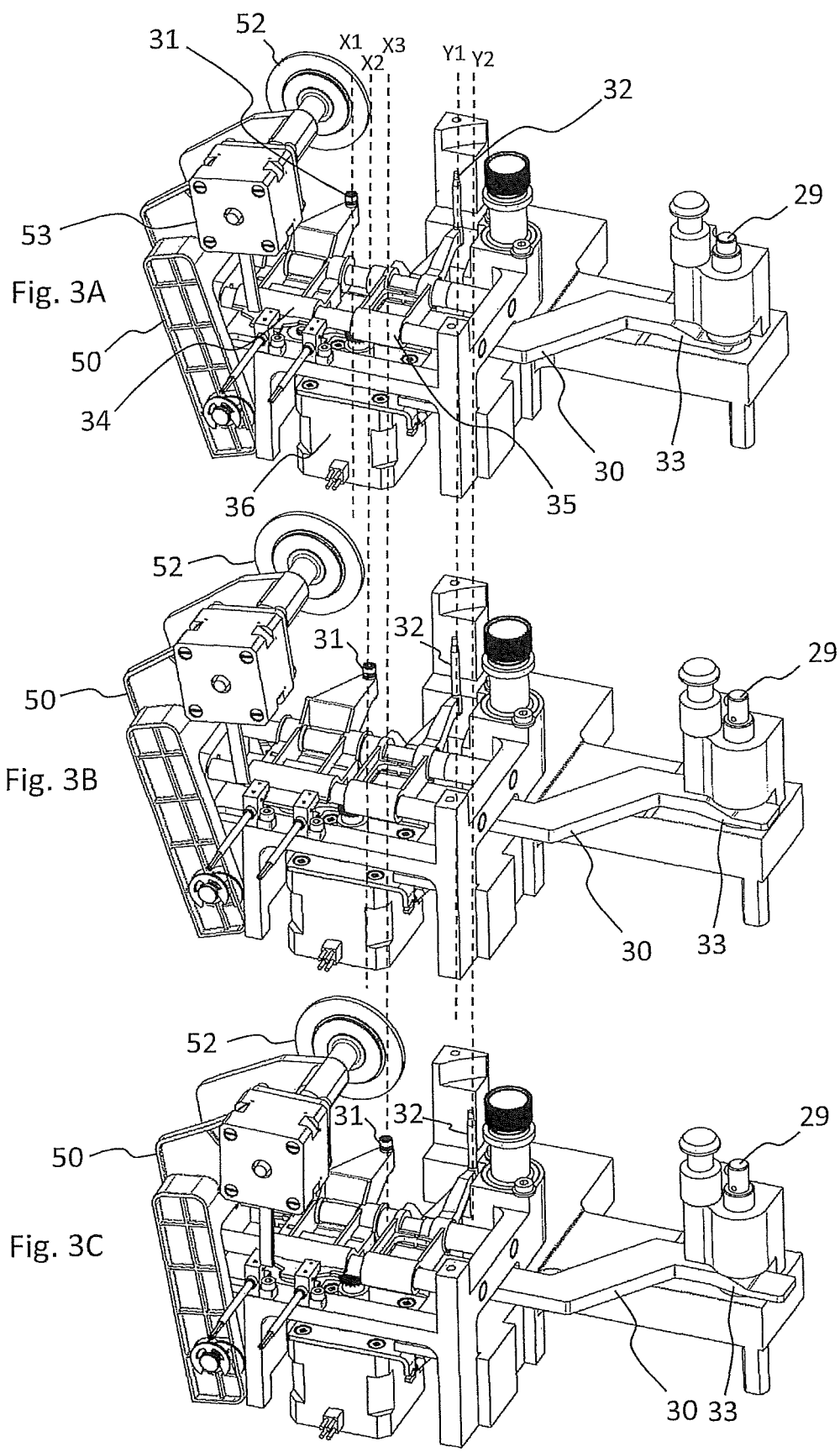

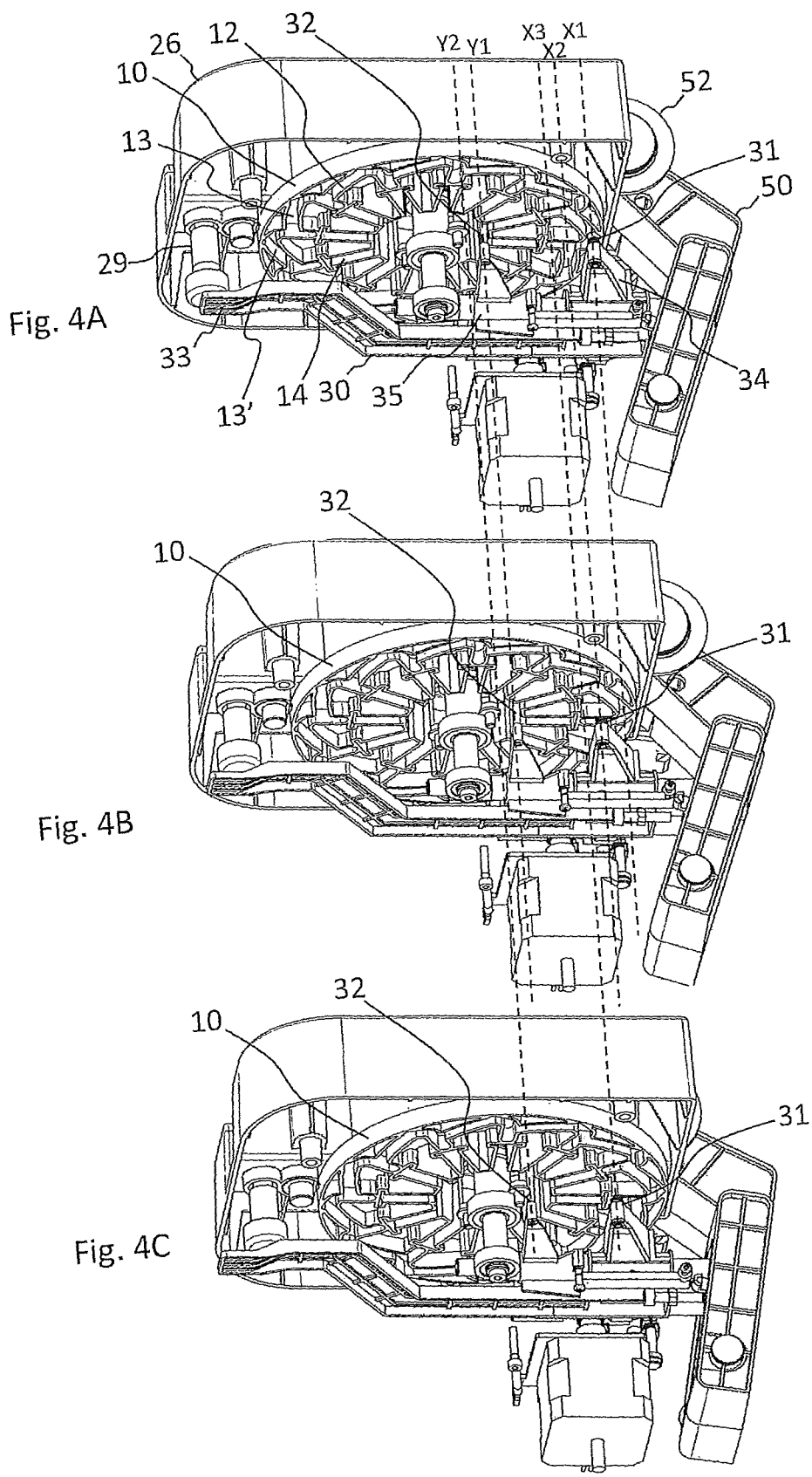

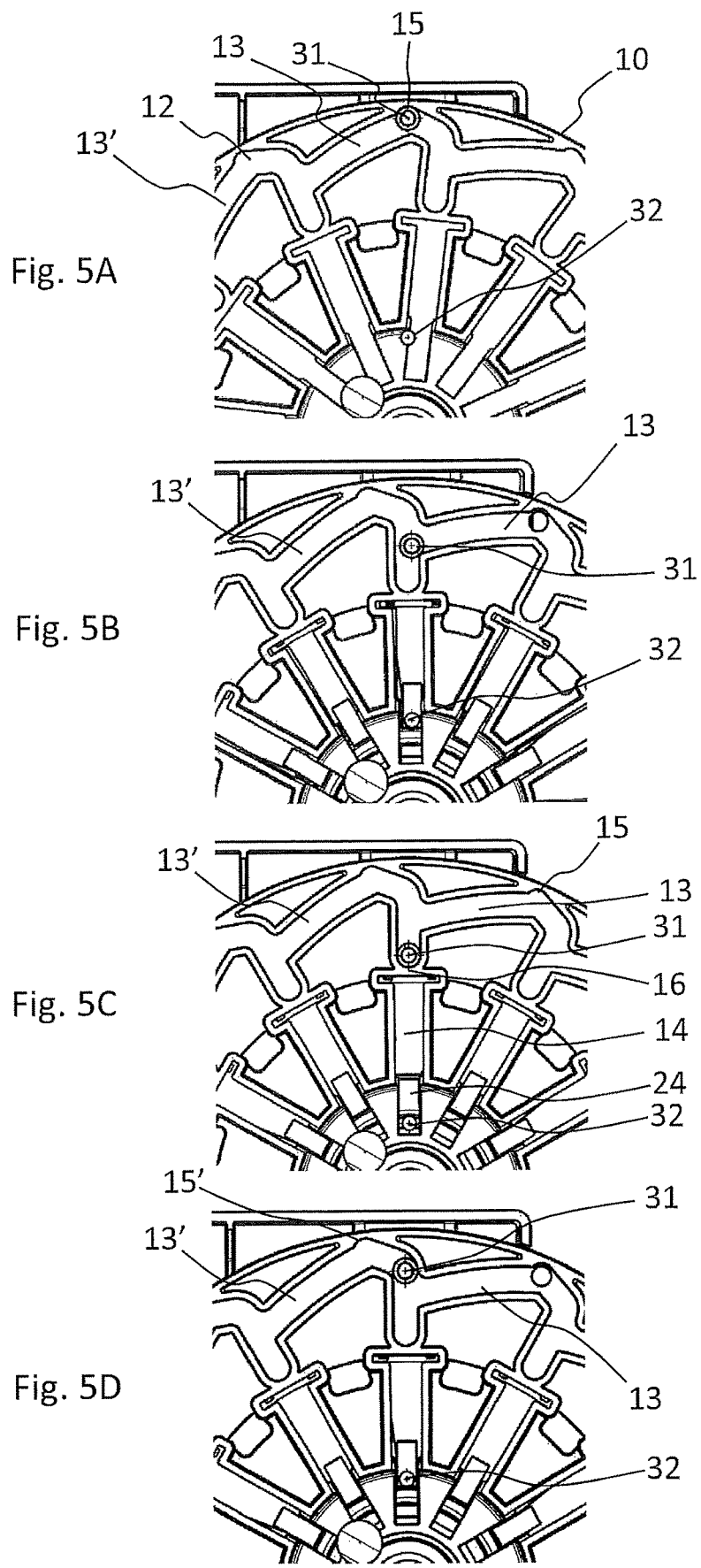

VESSEL DISPENSING SYSTEM

CROSS-REFERENCE TO RELATED APPLICATIONS

This application is a continuation of EP 18176773.2, filed Jun. 8, 2018, which is hereby incorporated by reference.

BACKGROUND

The present disclosure generally relates to a vessel dispensing system for dispensing vessels to an analyzer and to an automated in-vitro diagnostic system comprising an analyzer and the vessel dispensing system.

In some automated in-vitro diagnostics systems, consumables have to be loaded into the system to be used in an automated analysis process. The loading process may be automated, semi-automated or manual.

Some in-vitro diagnostic systems are equipped with a drawer for loading consumables into the automated analysis system. In these systems, an operator can store consumables in a rack and place the rack into the loading drawer. Subsequently, the operator closes the drawer and thereby moves the rack in the drawer into a working area of the automated analysis system. Other systems comprise a lift that raises a stack of racks from a lower part of the analysis system to a rack separation station, located higher, where a rack at a time located at the uppermost position of the stack is separated from the stack and becomes available for use. Once a rack reaches its final position in the in-vitro diagnostic system, the automated in-vitro diagnostic system can manipulate the consumable(s) loaded into the rack. For example, a robotic manipulator can grip the consumable(s) loaded (e.g., grip pipette tips and/or vessels stored in the rack) for further processing. Such robotic or otherwise automated manipulators can require a fairly precise placement of the consumables loaded.

Such solutions are more suitable for larger and high-throughput automated in-vitro diagnostics systems. However, for smaller and low-throughput in-vitro diagnostics systems, loading and precise positioning of racks can add significant hardware complexity to the in-vitro diagnostics system resulting in increased costs and also increased space requirements. Therefore, consumable loading solutions that are more compact and more simple are preferred in the latter case.

An alternative solution to the use of racks is based on bulk-loading of vessels into a first compartment and stacking of individual vessels into a second compartment from which they are dispensed to a chute before being gripped by a gripper. Such a device may be however susceptible to jamming and breakage of vessels. Another known device stores and dispenses cuvettes from a stack. The device has a carousel comprising a plurality of cuvette stack receiving compartments, which are tubes open at both ends, wherein one of the openings is provided with retaining springs. A cuvette separator with retaining spring spreaders is provided, moveable between a standby position away from the compartment and a cuvette separation position across the retaining spring opening of the compartment, and in between two cuvettes, sticking out of the compartment. This device is however specific for a particular and complex design of cuvettes which fit into each other and are clipped to each other. Also separating each cuvette from the stack requires mechanical levering which may cause cuvette damaging and requires also precise alignment. Also, it is not clear how the movement of the carousel and the cuvette separator are controlled with respect to each other.

Therefore, there is a need for a vessel dispensing system having a mechanical construction that is simple and inexpensive and a design that is compact and efficient resulting in a fast vessel loading process with a minimized risk of jamming or damaging vessels.

SUMMARY

According to the present disclosure, a vessel dispensing system for dispensing vessels to an analyzer. The vessel dispensing system can comprise a cam disc rotatable about an axis and comprising a guide groove. The vessel dispensing system can also comprise a drum arranged above the cam disc and coupled to the cam disc such as to be rotatable together with the cam disc about the same axis. The drum can comprise a plurality of elongated slots arranged along and around the axis. Each slot can comprise, at one end, an input interface for loading the slot with a plurality of vessels in a stacked manner and, at another end, an output interface for dispensing the vessels from the slot. The output interface can comprise a resilient vessel retainer. The vessel dispensing system can also comprise a crank translatable in a linear forwards and backwards direction orthogonal to the cam disc axis between a first, a second and a third position. The crank can comprise a drive pin slidable through the guide groove for rotating the cam disc and bringing a slot at a time in a dispensing position upon translation of the crank between the first position and the second position. The crank can further comprise an actuator pin translatable with respect to the drive pin for actuating the resilient vessel retainer of the output interface of the slot in the dispensing position upon translation of the crank between the second position and the third position, thereby allowing the vessels to be dispensed from the slot.

Accordingly, it is a feature of the embodiments of the present disclosure to provide for a vessel dispensing system having a mechanical construction that is simple and inexpensive and a design that is compact and efficient resulting in a fast vessel loading process with a minimized risk of jamming or damaging vessels. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 3A illustrates a crank of the vessel dispensing mechanism in a first position according to an embodiment of the present disclosure.

FIG. 3B illustrates a variant of FIG. 3A with the crank in a second position according to an embodiment of the present disclosure.

FIG. 3C illustrates a variant of FIG. 3A with the crank in a third position according to an embodiment of the present disclosure.

FIG. 3 illustrates a comparison of FIGS. 3A-C in alignment with each other according to an embodiment of the present disclosure.

FIG. 4A illustrates the crank of the vessel dispensing mechanism in the first position from another perspective and in relation to a cam disc according to an embodiment of the present disclosure.

FIG. 4B illustrates a variant of FIG. 4A with the crank in a second position according to an embodiment of the present disclosure.

FIG. 4C illustrates a variant of FIG. 4A with the crank in a third position according to an embodiment of the present disclosure.

FIG. 4 illustrates a comparison of FIGS. 4A-C in alignment with each other according to an embodiment of the present disclosure.

FIG. 5A illustrates the position of a drive pin and an actuator pin with respect to the cam disc when the crank is in the first position according to an embodiment of the present disclosure.

FIG. 5B illustrates the position of a drive pin and an actuator pin with respect to the cam disc when the crank is in the second position according to an embodiment of the present disclosure.

FIG. 5C illustrates the position of a drive pin and an actuator pin with respect to the cam disc when the crank is in the third position according to an embodiment of the present disclosure.

FIG. 5D illustrates the position of a drive pin and an actuator pin with respect to the cam disc in the process of returning to the first position according to an embodiment of the present disclosure.

DETAILED DESCRIPTION

Figure 1:
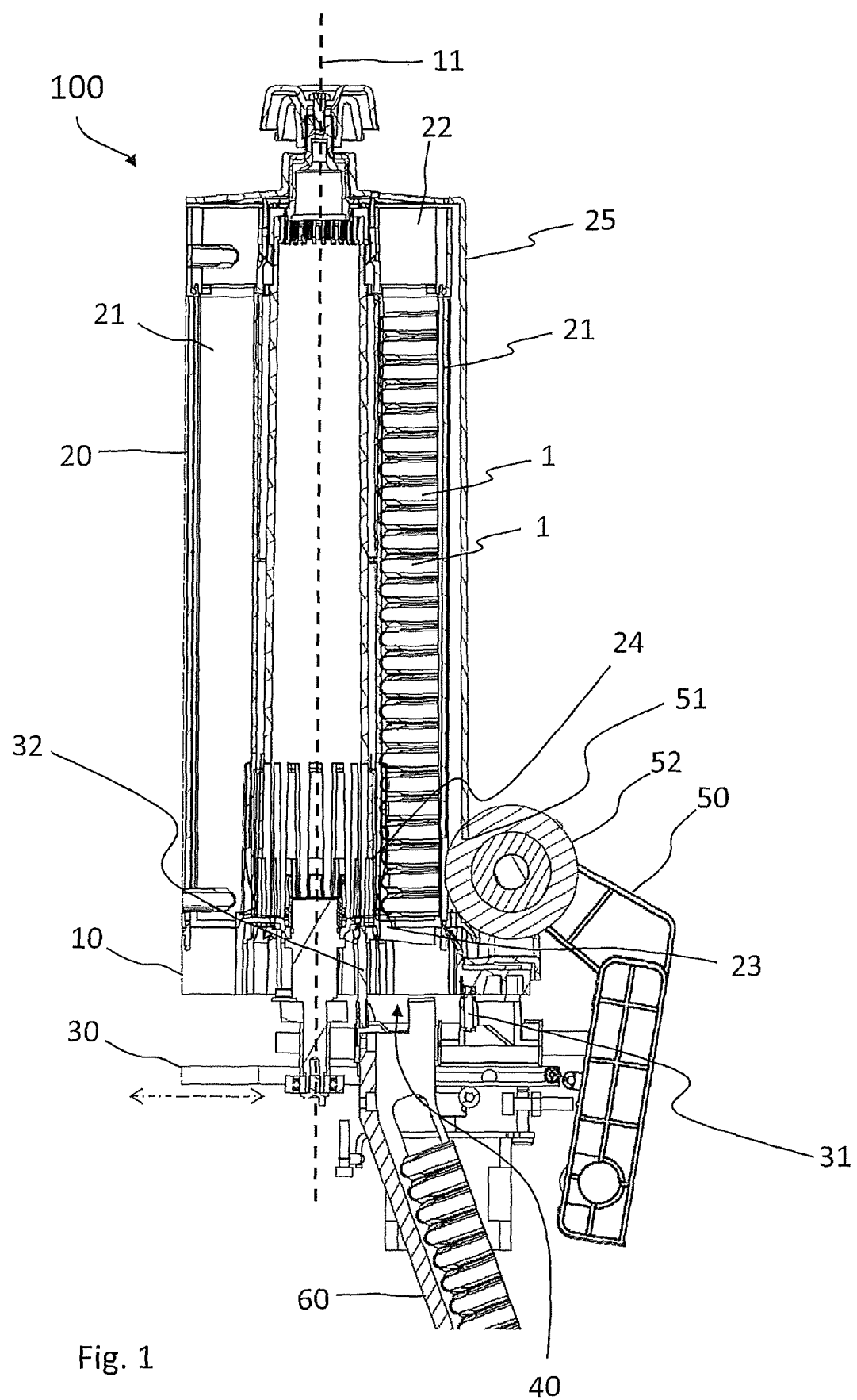
FIG. 1 illustrates a partial cross-sectional view of a vessel dispensing system according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A vessel dispensing system for dispensing vessels to an analyzer is herein disclosed. The vessel dispensing system can comprise a cam disc rotatable about an axis and comprising a guide groove. The vessel dispensing system can further comprise a drum arranged above the cam disc and coupled to the cam disc such as to be rotatable together with the cam disc about the same axis, the drum comprising a plurality of elongated slots arranged along and around the axis, each slot comprising at one end an input interface for loading the slot with a plurality of vessels in a stacked manner and at another end an output interface for dispensing the vessels from the slot, the output interface comprising a resilient vessel retainer. The vessel dispensing system can further comprises a crank translatable in a linear forwards and backwards direction substantially orthogonal to the cam disc axis between a first, a second and a third position, the crank comprising a drive pin slidable through the guide groove for rotating the cam disc and bringing a slot at a time in a dispensing position upon translation of the crank between the first position and the second position, the crank further comprising an actuator pin translatable with respect to the drive pin for actuating the resilient vessel retainer of the output interface of the slot in the dispensing position upon translation of the crank between the second position and the third position, thereby allowing the vessels to be dispensed from the slot.

An automated in-vitro diagnostic system comprising an analyzer and the above vessel dispensing system is herein also disclosed.

The vessel dispensing system herein disclosed can have one or more advantageous effects. The mechanical construction can be simple and inexpensive and the design can be compact and efficient. In particular, both rotation of the drum in order to bring a slot at a time in the dispensing position and dispensing of vessels can be achieved with a single linear reciprocating motion operated by a single drive. Also, vessels can be stacked in an orderly and compact manner side by side without being clipped to each other whereas an entire stack of vessels can be loaded into a slot and dispensed from a slot very quickly, thereby making the vessel loading process fast. In addition, the risk of jamming or damaging vessels can be minimized. Further advantages can be achieved in relation to some embodiments disclosed herein.

After having explained some advantages of the vessel dispensing system, several terms which are used in a particular meaning in the present disclosure are discussed subsequently.

An "automated in-vitro diagnostics system" can be a laboratory automated apparatus dedicated to the analysis of samples for in-vitro diagnostics. The in-vitro diagnostics system may have different configurations according to the need and/or according to the desired laboratory workflow. Additional configurations may be obtained by coupling a plurality of apparatuses and/or modules together. A "module" can be a work cell, typically smaller in size than the entire in-vitro diagnostics system, which can have a dedicated function. This function can be analytical but can be also pre-analytical or post analytical or it can be an auxiliary function to any of the pre-analytical function, analytical function or post-analytical function. In particular, a module can be configured to cooperate with one or more other modules for carrying out dedicated tasks of a sample processing workflow such as, for example, by performing one or more pre-analytical and/or analytical and/or post-analytical steps. Thus, the in-vitro diagnostic system may comprise one analytical apparatus or a combination of any of such analytical apparatuses with respective workflows, where pre-analytical and/or post analytical modules may be coupled to individual analytical apparatuses or be shared by a plurality of analytical apparatuses. In alternative, pre-analytical and/or post-analytical functions may be performed by units integrated in an analytical apparatus. The in-vitro diagnostics system can comprise functional units such as liquid handling units for pipetting and/or pumping and/or mixing of samples and/or reagents and/or system fluids, and also functional units for loading, unloading, sorting, storing, transporting, identifying, separating, detecting.

An "analyzer" can be an analytical apparatus comprising at least a detector and that depending on the particular type of sample or analyte(s) of interest may be based on a particular measurement principle and configured to follow a particular workflow such as, for example, execute a number of processing steps, which can be optimized for certain types of analysis such as, for example, clinical chemistry, immunochemistry, coagulation, hematology, and the like. The analyzer can comprise functional units such as liquid handling units for pipetting and/or pumping and/or mixing of samples and/or reagents and/or system fluids, functional units for receiving and/or handling vessels or other consumables, sample tubes, reagent containers.

The term "vessel" can be herein used to indicate a consumable which can be introduced recurrently into an in-vitro diagnostic system mostly for use by an analyzer while executing an analytical process, but can be also used in a pre-analytical or post-analytical process. In particular, the vessel can be a container comprising a body and an inner space adapted for receiving liquids such as, for example, samples or reagents or mixtures of samples and reagents in order e.g., for a reaction to occur, or to enable detection of one or more analytes of interest possibly present in a sample. According to certain embodiments, the vessel can be a cuvette, i.e., a container that is at least in part optically transparent and shaped to allow photometric measurement, like, for example, the measurement of changes in optical transmission, such as, for example, absorbance and scattering, of a liquid contained therein. In particular, the cuvette may be used in the performance of absorbance or scattering assays to detect the result of a chemical or biological reaction or to monitor the progress of a chemical or biological reaction such as, for example, in a coagulation assay, agglutination assay, turbidimetric assay. According to one embodiment, the cuvette body can comprise side walls, a closed bottom and an upper opening for allowing liquids to be introduced in an inner space formed by the side walls and the closed bottom. According to one embodiment, the cuvette can comprise at least one lip projecting outwards of the cuvette body in proximity of the upper opening. This lip may be convenient for gripping the cuvette by the vessel gripper and/or for holding the cuvette. The cuvette may have an inner volume in the milliliter or microliter range.

A "vessel dispensing system" can be a transfer mechanism configured to transfer vessels from the outside to the inside of an in-vitro diagnostic system to a particular fixed position where they can be sequentially taken over and used in an analytical process. The vessel dispensing system can comprise a cam disc rotatable about an axis and a drum arranged above the cam disc that can be coupled to the cam disc such as to be rotatable together with the cam disc about the same axis. The drum can be like a carousel comprising a plurality of slots having an upper open end and a lower open end, arranged substantially parallel to the axis and at a regular distance from each other such as, for example, symmetrically arranged about the axis. The slots can be vessel receiving compartments each configured to receive, temporarily hold and subsequently dispense, a plurality of vessels. In particular, each slot can comprise at the upper open end an input interface for loading the slot with a plurality of vessels in a stacked manner and at the lower open end an output interface for dispensing the vessels from the slot, the output interface comprising a resilient vessel retainer for preventing the vessels from falling out of the slot until actuated.

The cam disc can be part of a drive unit comprising also a crank coupled to the cam disc configured to convert a linear movement of the crank into a rotational movement of the cam disc and thereby of the drum coupled thereto. In particular, the crank can be translatable in a linear forwards and backwards (reciprocating) direction substantially orthogonal to the cam disc axis between a first, a second and a third position relative to the axis of the cam disc. In particular, the cam disc can comprise a guide groove and the crank can comprise a drive pin slidable through the guide groove, where the guide groove can be designed such that at each reciprocation the cam disc can be rotated of one sector of circle corresponding to the angular distance between two slots, thereby bringing a slot at a time in a dispensing position. In particular, the guide groove can comprise repetitive paths including curves and dead ends acting as stops for the drive pin at each reciprocation. The crank can further comprise an actuator pin, where the drive pin and the actuator pin can be translatable with respect to each other. The actuator pin can have the function of actuating the resilient vessel retainer of the output interface of the slot in the dispensing position upon translation of the crank, thereby allowing the vessels to be dispensed from the slot that is in the dispensing position. The crank can thus comprise two parts, one part comprising the drive pin and one part comprising the actuator pin, the two parts being resiliently coupled to each other, e.g., using a spring, such that, for example, in a first movement in one direction only the drive pin moves whereas the actuator pin remains stationary and in a second further movement in the same direction both the drive pin and the actuator pin move. The reverse movement can then be carried out in the opposite direction at each reciprocation. Thus the first position of the crank can correspond to a position in which the drive pin and the actuator pin are in a first position, the second position of the crank can correspond to a position in which the drive pin is in a second position and the actuator pin is still in the first position, and the third position of the crank can correspond to a position in which the drive pin is in a third position and the actuator pin is in a second position. Of course, the two parts may be coupled to each other in a different but equivalent manner, where, for example, the first position of the crank can correspond to a position in which the drive pin and the actuator pin are in a first position, the second position of the crank can correspond to a position in which the drive pin is in a second position and the actuator pin is still in the first position, and the third position of the crank can correspond to a position in which the drive pin is still in the second position and the actuator pin is also in a second position.

Translation of the crank can be conveniently automated such as, for example, by a spindle drive or gear coupling or any similar mechanism driven by a single motor such as, for example, an electrical stepper or DC motor.

According to an embodiment, the cam disc can comprise through passages aligned respectively with the output interfaces of the slots for allowing the vessels of the slot in the dispensing position to pass such as, for example, fall by gravity, through the respective passage when the crank is in the third position.

According to an embodiment, the vessel dispensing system can comprise a vessel distributor to release individual vessels one at a time from the stack of vessels in the slot, the vessel distributor being pivotally coupled to the crank such as to come in contact or out of contact with the stack upon translation of the crank between the second position and the third position. Thus, pivoting of the vessel distributor in order to come in contact or out of contact with the stack can be achieved with the same linear reciprocating motion that is also used to rotate the drum and actuate the resilient vessel retainer. In particular, pivoting of the vessel distributor can be synchronized with actuation of the resilient vessel retainer, where the function of the vessel distributor can be to prevent that all the vessels in the slot fall by gravity at the same time and to enable controlled dispensing of a vessel at a time from the bottom of the stack while retaining the rest of the vessels of the stack.

According to an embodiment, the vessel distributor can comprise a rotatable brush, where an individual vessel from the stack can be dispensed out of the slot every time that the brush is rotated. Any alternative material with similar properties in terms of softness and elasticity such as, for example, a rubber or sponge ring can be used.

According to an embodiment, the vessel dispensing system can comprise a drum-holding housing where the drum can be rotatable with respect to the housing. In particular, the housing can be fixed or kept stationary with respect to the vessel dispensing system, whereas the drum becomes engaged with the cam disc and can rotate when the cam disc can rotate. According to an embodiment, the drum-holding housing can comprise a grip for manually gripping the housing and enabling separation of the housing and of the drum contained therein from the vessel dispensing system. This can be advantageous for facilitating re-loading of vessels into the slots of the drum outside of the in-vitro diagnostics system.

According to an embodiment, the vessel dispensing system can comprise a housing-lock mechanism for fixing and locking the housing with respect to the vessel dispensing system. The main function of the housing-lock mechanism can be to prevent that the housing is removed when the vessel dispensing system is in use, e.g., while dispensing vessels.

According to an embodiment, the crank can comprise a lever arm for locking/unlocking the housing-lock mechanism upon translation of the crank between the first position and the second position or the third position. In particular, the housing-lock mechanism may comprise a locking pin or similar mechanical element that can be actuated upon translation of the crank. Thus the crank may still be provided with a locking/unlocking function additionally to that of driving the drum, actuating the resilient vessel retainer and pivoting the vessel distributor, and all can be achieved with same linear reciprocating motion by a single drive, thus resulting in an ever increased efficiency. Based on the same concept, further or at least in part alternative functions may be integrated.

According to an embodiment, the grip can be part of the housing-lock mechanism. In particular, the grip may comprise a release handle or button that can require manual pressure for releasing and/or fixing the housing to the vessel dispensing system, where this release handle or button can be locked when the crank is in a locking position and can be prevented from being pressed.

According to an embodiment, the vessel dispensing system can comprise a separate manual vessel cartridge loaded with a stack of vessels and configured to be plugged at one end into the input interface of the slot, the cartridge comprising a resilient stack retainer that can be biased upon plugging into the input interface thereby enabling the stack of vessels to be loaded by gravity into the slot. Vessels may thus be conveniently preloaded at manufacture in cartridges configured to contain a predefined number of vessels, the same number that fits into a slot of the drum. The use of such cartridges can facilitate packaging and transport and especially loading of the vessels into the vessel dispensing system, which can become quick and easy. The vessel cartridge may be made of an inexpensive material such as, for example, plastic, that may be disposable once vessels have been loaded into a slot.

According to an embodiment, the vessel dispensing system can comprise a vessel receiving chute arranged beneath the cam disc in alignment with the vessel dispensing position such as to receive and stack by gravity the vessels being dispensed from the slot.

According to an embodiment, the vessel dispensing system can comprise a gripper for picking one vessel at a time from the chute and moving the vessel to the analyzer such as, for example, to a pipetting position for a sample and/or a reagent to be dispensed therein, to an incubation position, to a detection position or to a vessel receiving position of such as, for example, a multi vessel carrier such as, for example, a static vessel block or a movable carrier such as a carousel or rotor.

According to an embodiment, the vessel dispensing system can comprise a chute sensor for monitoring if the number of vessels in the chute falls below a threshold number before further vessels are dispensed from a slot or before the drum is rotated to bring the next slot in the dispensing position. The chute sensor may be for example an optical sensor, e.g., a light-barrier sensor or the like.

According to an embodiment, the vessel dispensing system can comprise a slot sensor for detecting whether the slot next to the slot in the dispensing position is loaded with vessels or is empty, before the drum is rotated to bring the next slot in the dispensing position and for eventually triggering loading of vessels into the slots. The slot sensor may be for example an optical sensor, e.g., a light-barrier sensor or the like.

Figure 2:
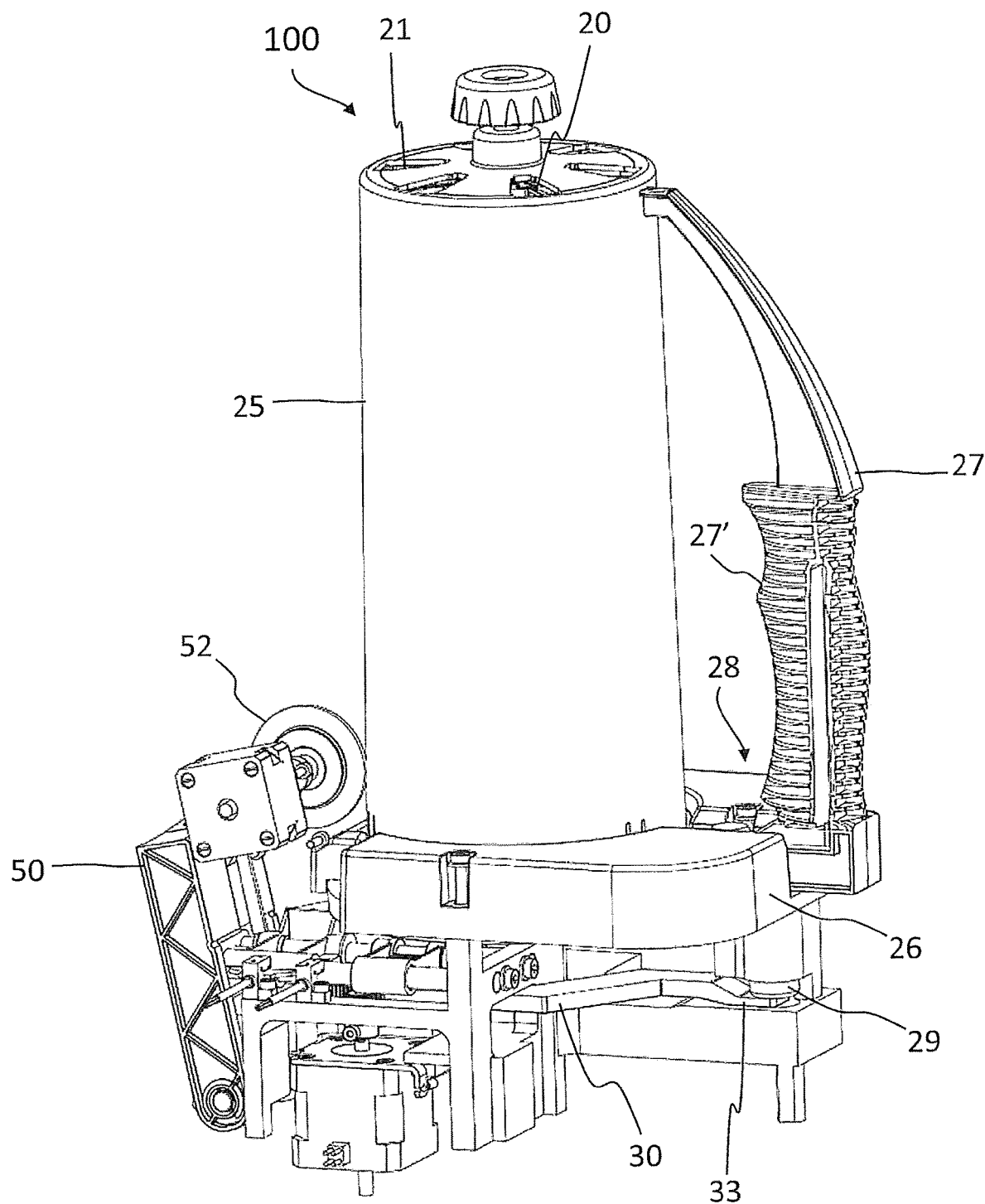
FIG. 2 illustrates a partial perspective view of a vessel dispensing system according to an embodiment of the present disclosure.

Referring initially to FIG. 1, FIG. 1 is a partial cross-sectional view illustrating an example of vessel dispensing system 100 for dispensing vessels 1 and FIG. 2 illustrates a partial perspective view of the same vessel dispensing system 100 and are best understood when taken together. The vessel dispensing system 100 can comprise a cam disc 10 (see FIG. 1) rotatable about an axis 11.

The vessel dispensing system 100 can further comprise a drum 20 arranged above the cam disc 10 and coupled to the cam disc 10 such as to be rotatable together with the cam disc 10 about the same axis 11, the drum 20 comprising a plurality of elongated slots 21 arranged along and around the axis 11, each slot 21 comprising at one end an input interface 22 for loading the slot 21 with a plurality of vessels 1 in a stacked manner and at another end an output interface 23 for dispensing the vessels from the slot 21, the output interface 23 comprising a resilient vessel retainer 24 (see FIG. 1). The drum 20 can be enclosed in a drum-holding housing 25. The drum 20 can be rotatable with respect to the housing 25. In particular, the housing 25 can be fixed, at least temporarily, with respect to the vessel dispensing system 100, in this case docked into a housing-docking element 26 (see FIG. 2) where the drum 20 can become engaged with the cam disc 10 (see FIG. 1) arranged below the housing-docking station 26 and can be allowed to rotate when the cam disc 10 is allowed to rotate. The drum-holding housing 25 can comprise a grip 27 for manually gripping the housing 25 and enabling separation of the housing 25 and of the drum 20 contained therein from the vessel dispensing system 100. The vessel dispensing system 100 can further comprise a housing-lock mechanism 28 for temporarily fixing and locking the housing 25 with respect to the vessel dispensing system 100 and in particular with respect to the housing-docking element 26.

The vessel dispensing system 100 can further comprise a crank 30 translatable in a linear forwards and backwards direction substantially orthogonal to the cam disc axis 11. The crank 30 can comprise a drive pin 31 (see FIG. 1) for rotating the cam disc 20 and bringing a slot 21 at a time in a dispensing position 40 upon translation of the crank 30.

The crank 30 can further comprise an actuator pin 32 (see FIG. 1) translatable with respect to the drive pin 31 for actuating the resilient vessel retainer 24 of the output interface 23 of the slot 21 in the dispensing position 40 upon translation of the crank 30, thereby allowing the vessels 1 to be dispensed from the slot 21.

The vessel dispensing system 100 can further comprise a vessel receiving chute 60 (see FIG. 1) arranged beneath the cam disc 10 in alignment with the vessel dispensing position 40 such as to receive and stack by gravity the vessels 1 being dispensed from the slot 21 in the vessel dispensing position 40. The vessel dispensing system 100 can further comprise a vessel distributor 50 to release individual vessels one at a time from the stack of vessels 1 in the slot 21 that is in the vessel dispensing position 40, the vessel distributor 50 being pivotally coupled to the crank 30 such as to come in contact or out of contact with the stack of vessels 1 through a slit 51 of the housing 25 (see FIG. 1) upon translation of the crank 30. Pivoting of the vessel distributor 50 is synchronized with actuation of the resilient vessel retainer 24 so that the vessel distributor 50 is in contact with the vessels 1 when the vessel retainer 24 is open and is out of contact when the vessel retainer 24 is closed. The vessel distributor 50 comprises a rotatable brush 52, where an individual vessel 1 from the stack is dispensed out of the slot 21 every time that the brush 52 in contact with the vessels 1 rotates.

The crank 30 can further comprise a lever arm 33 (see FIG. 2) for locking/unlocking the housing-lock mechanism 28 upon translation of the crank 30. In particular, the housing-lock mechanism 28 can comprise a locking pin 29 (see FIG. 2) that is actuated upon translation of the crank 30 (see also FIG. 3). The grip 27 of the housing 25 can be part of the housing-lock mechanism 28. In particular, the grip 27 can comprise a release handle 27' that can require manual pressure for releasing and/or fixing the housing 25 to the housing docking station 26, where the release handle 27' can be locked when the crank 30 is in a locking position and the locking pin 29 is actuated (pushed upwards in this example) and can be prevented from being pressed.

Some of the details of FIG. 1 and FIG. 2 and additional details will become clearer with reference to the other figures.

FIG. 3 including FIGS. 3A-C illustrates in more detail the mechanism of the crank 30 of the vessel dispensing mechanism 100 with its functional units, where in FIG. 3A, the crank 30 is in a first position, in FIG. 3B, the crank 30 is in a second position and, in FIG. 3C, the crank 30 in a third position. Dashed vertical lines are drawn through FIGS. 3A-C, aligned with each other, in order to better notice the different respective positions of the functional units of the crank 30 when the position of the crank 30 changes.

In particular, the first position of the crank 30 (see FIG. 3A) corresponds to a position in which the drive pin 31 and the actuator pin 32 are in a first position X1, Y1 respectively, the second position of the crank 30 (see FIG. 3B) corresponds to a position in which the drive pin 31 is in a second position X2 and the actuator pin 32 is still in the first position Y1, and the third position of the crank 30 (see FIG. 3C) corresponds to a position in which the drive pin 31 is in a third position X3 and the actuator pin 32 is in a second position Y2. The crank 30 can comprise two parts 34, 35, one part 34 comprising the drive pin 31 and one part 35 comprising the actuator pin 32, the two parts 34, 35 being resiliently coupled to each other, using a spring (not shown), such that, for example, in a first movement in one direction, only the first part 34 with the drive pin 31 moves whereas the second part 35 with the actuator pin 32 remains stationary and, in a second further movement in the same direction, both the first part 34 with the drive pin 31 and the second part 35 with the actuator pin 32 can move. The reverse movement can then be carried out in the opposite direction at each reciprocation.

The lever arm 33 can be rigidly connected to the first part 34 of the crank 30 and therefore can move together with the first part 34. In particular, it can be noted that the first position of the crank 30 can correspond to an unlocking position of the lever arm 33, with the locking pin 29 in a lower non-engaged position (see FIG. 3A), whereas the second and third positions correspond to a locking position with the locking pin 29 being in an elevated engagement position (see FIGS. 3B-C).

On the other hand, the vessel distributor 50 can be coupled to the second part 35 of the crank 30 (best viewed in FIG. 4) and therefore can move together with the second part 35. In particular, it can be noted that the first position and the second position of the crank 30 (see FIGS. 3A-B) correspond to an out-of-contact position of the vessel distributor 50, with its rotating brush 52 (see FIG. 3A), whereas when the crank 30 is moved into the third position (see FIG. 3C), the vessel distributor 50 can be in a pivoted contact position that brings the rotating brush 52 in contact the vessels 1 in the slot 21 (see FIG. 1). Thus, the vessel distributor 50 can move together with the actuator pin 32, as already discussed with reference to FIG. 1, so that the vessel distributor 50 can be in contact with the vessels 1 when the vessel retainer 24 is open and can be out of contact when the vessel retainer 24 is closed.

Translation/reciprocation of the crank 30, and therefore of the drive pin 31, actuator pin 32 and lever arm 33, as well as pivoting of the vessel distributor 50, can be achieved by a single drive 36, whereas a second drive 53 can be used for rotating the brush 52.

FIG. 4 including FIGS. 4A-4C in combination with FIGS. 5A-D illustrate in more detail the cam disc 10 and how the crank 30 operates in relation to the cam disc 10. In FIG. 4A, the crank 30 is in the first position, in FIG. 4B, the crank 30 is in the second position, and, in FIG. 4C, the crank 30 is in the third position. Analogously to FIG. 3, dashed vertical lines are drawn through FIGS. 4A-C, aligned with each other, in order to better notice the different respective positions of the crank 30 and its functional units when the position of the crank 30 changes.

The cam disc 10, arranged below the housing docking station 26, can comprise a guide groove 12, in which the drive pin 31 fits and can slide through. The guide groove 12 can be designed such that at each reciprocation, the cam disc 10 can be rotated of one sector of circle corresponding to the angular distance between two slots 21 of the drum 20 (not shown in FIG. 4), thereby bringing a slot 21 at a time in the dispensing position 40 (see FIG. 1). In particular, the guide groove 12 can comprise repetitive paths 13, 13' including curves and dead ends acting as stops for the drive pin 31 at each reciprocation (as can be better understood from looking at FIGS. 5A-D).

In addition, the cam disc 10 can comprise through passages 14 aligned respectively with the output interfaces 23 of the slots 21 for allowing the vessels 1 of the slot 21 in the dispensing position 40 (refer to FIG. 1) to pass through the respective passage 14 when the crank 30 is in the third position and the vessels 1 are dispensed.

Otherwise, for the rest, FIG. 4 is to compare to FIG. 3, where the same reference numbers have been used for the same features and the same description applies.

FIG. 5A illustrates, in plain view, the position of the drive pin 31 and the actuator pin 32 with respect to the cam disc 10 when the crank is in the first position. In particular, the drive pin 31 can be at a dead end 15 of a repetitive path 13 of the guide groove 12. Upon translation of the crank from the first position to the second position, the drive pin 31 can slide through repetitive path 13 and causes rotation of the cam disc 10 of one sector, as shown in FIG. 5B. The drum is not shown in FIG. 5A.

FIG. 5B illustrates, in plain view, the position of the drive pin 31 and the actuator pin 32 with respect to the cam disc 10 when the crank is in the second position.

FIG. 5C illustrates, in plain view, the position of the drive pin 31 and the actuator pin 32 with respect to the cam disc 10 when the crank is in the third position. In particular, upon translation of the crank from the second position into the third position, the drive pin 31 can come at a second dead end 16 of the repetitive path 13, whereas the actuator pin 32 can actuate the vessel retainer 24, thereby allowing vessels to be dispensed through passage 14.

FIG. 5D illustrates, in plain view, the position of the drive pin 31 and the actuator pin 32 with respect to the cam disc 10 in the process of returning to the first position, until the drive pin 31 comes to the first dead end 15' of the next repetitive path 13' and the cycle can be repeated along repetitive path 13'.

Figure 6A:
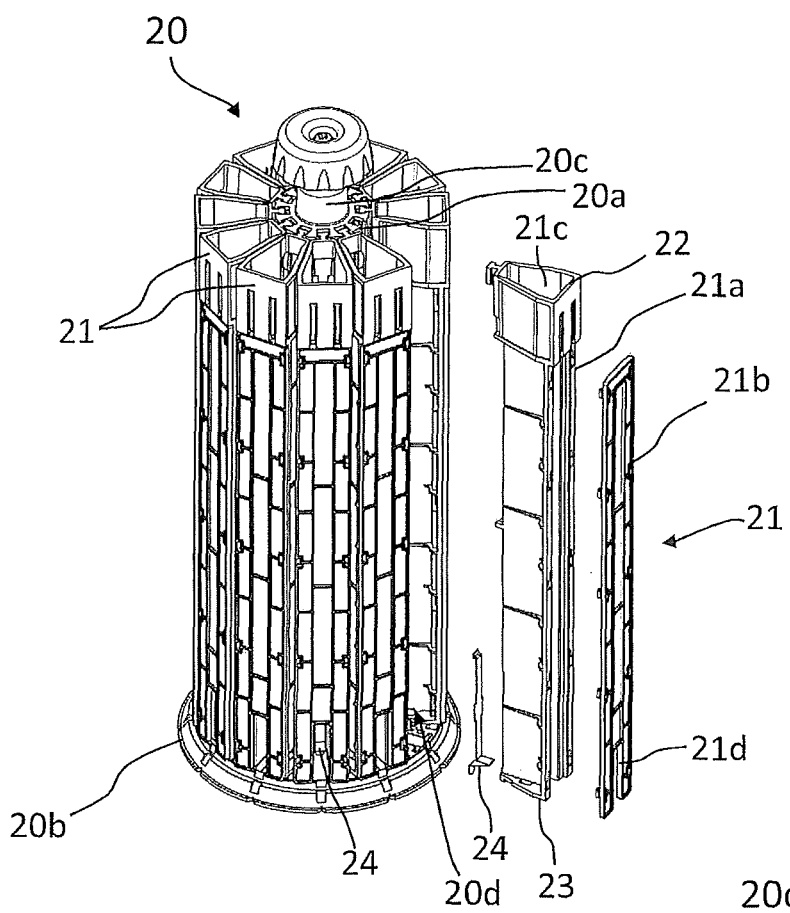
FIG. 6A illustrates the structure of a drum according to an embodiment of the present disclosure.

FIG. 6A illustrates in more detail the structure of the drum 20 of FIGS. 1-2. The drum 20 can comprise a structural body 20a comprising a base plate 20b and a central column 20c and providing a plurality of slot docking positions 20c arranged symmetrically at constant angular distance around the central column 20c. The drum 20 can further comprise a plurality of elongated slots 21 docked into respective slot docking positions 20d. The drum 20 can thus be modular, with the slots 21 being replaceable. Each slot 21 can comprise, for ease of manufacturing, two parts 21a, 21b forming an inner space 21c when assembled for receiving a stack of vessels therein. The slot 21 can comprise at one end an input interface 22 for loading the slot 21 with a plurality of vessels and at another end an output interface 23 for dispensing the vessels from the slot 21. In addition, a resilient vessel retainer 24, in this case a leaf spring, can be coupled to the output interface 23 in a sandwich arrangement between the slot 21 and the structural body 20a and can be actuated through the base plate 20b. The part 21b of the slot 21 can further comprise a slit 21d for the vessel distributor 50 to come in contact with the vessels in the inner space 21c.

Figure 6B:
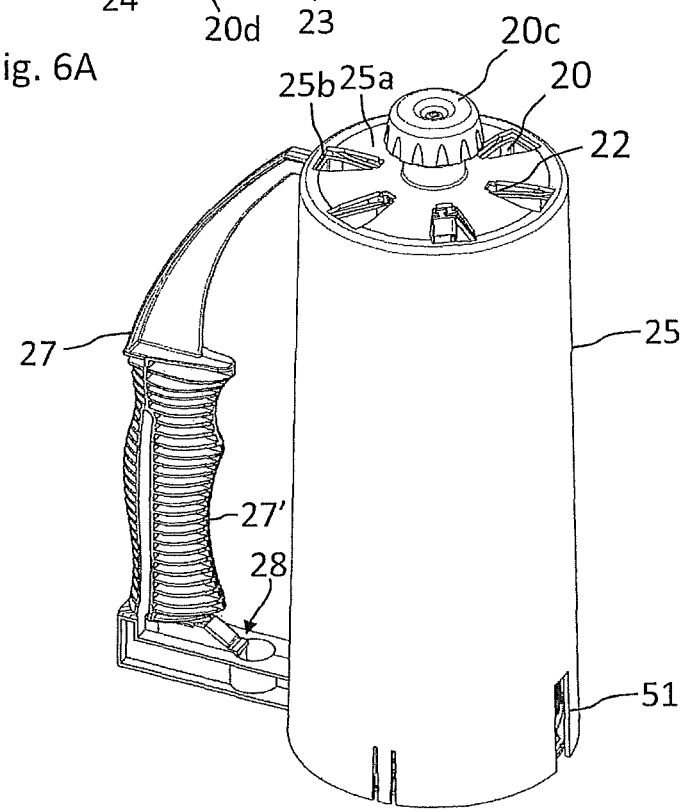
FIG. 6B illustrates a drum-holding housing comprising the drum of FIG. 6A according to an embodiment of the present disclosure.

FIG. 6B illustrates a drum-holding housing 25 comprising the drum 20 of FIG. 6A enclosed therein. The drum 20 can be rotatable with respect to the housing 25 such as, for example, when the drum 20 becomes engaged with the cam disc (not shown in FIG. 6B) and the cam disc can rotate, while the housing 25 can be kept stationary, or manually, such as, for example, by manually rotating the central column 20c while keeping the housing 25 stationary. In particular, the drum-holding housing 25 can comprise a grip 27 for manually gripping the housing 25. The grip 27 can further comprise part of the housing-lock mechanism 28, including release handle 27', for temporarily fixing and locking the housing 25 with respect to the vessel dispensing system 100 and, in particular, with respect to the housing-docking element 26, described in relation to FIGS. 2-3. The housing 25 can further comprise a lid 25a comprising a plurality of openings 25b. The number of openings 25b can be lower than the number of slots 21, in this example, where different slots 21 can be brought in alignment with any of the openings 25b by rotating the drum 20 with respect to the housing such as, for example, in order to load the slots 21 with vessels, through the input interfaces 22. The housing 25 can further comprise a slit 51 aligned with the vessel dispensing position when the housing 25 is docked into the housing-docking element for the vessel distributor to come in contact with the stack of vessels in the slot 21 at that position. In particular, the slit 51 can be positioned at a position of the housing 20 where the slit 21d of a slot 21 comes into alignment with the slit 51 at each reciprocation of the crank.

Figure 7A:
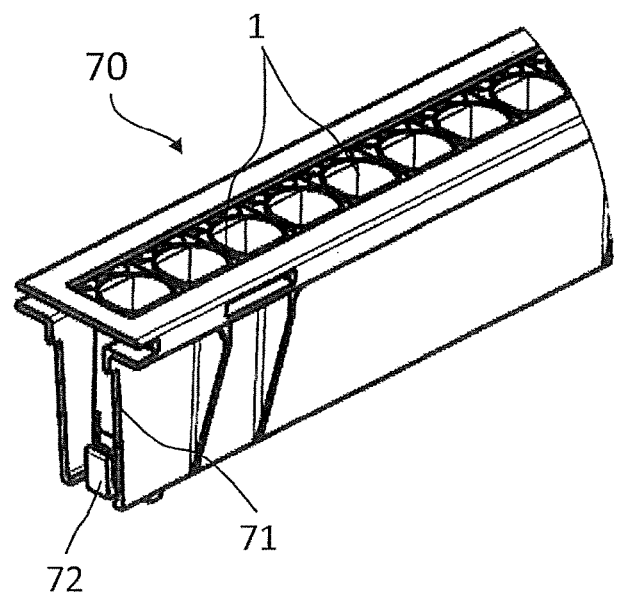
FIG. 7A illustrates a partial illustration of a manual vessel cartridge according to an embodiment of the present disclosure.

FIG. 7A is a partial illustration of a manual vessel cartridge 70 loaded with a stack of vessels 1 and adapted to be plugged at one end 71 into the input interface 22 of a slot 21 of the drum 20. In particular, the cartridge 70 can comprise a resilient stack retainer 72 that can be biased upon plugging into the input interface 22 thereby enabling the stack of vessels 1 to be loaded by gravity into the slot 21. Vessels 1 may thus be conveniently preloaded at manufacture in cartridges 70 configured to contain a predefined number of vessels 1, the same number that fits into a slot 21 of the drum 20.

Figure 7B:
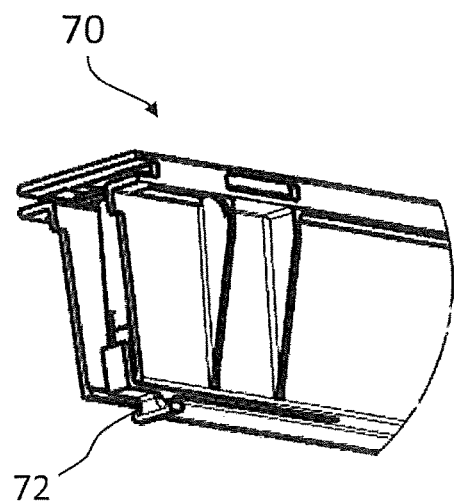
FIG. 7B illustrates further details of the manual vessel cartridge in a cross-sectional view according to an embodiment of the present disclosure.

FIG. 7B illustrates further details of the manual vessel cartridge 70 and the resilient stack retainer 72 in a cross-sectional view, without vessels.

Figure 7C:
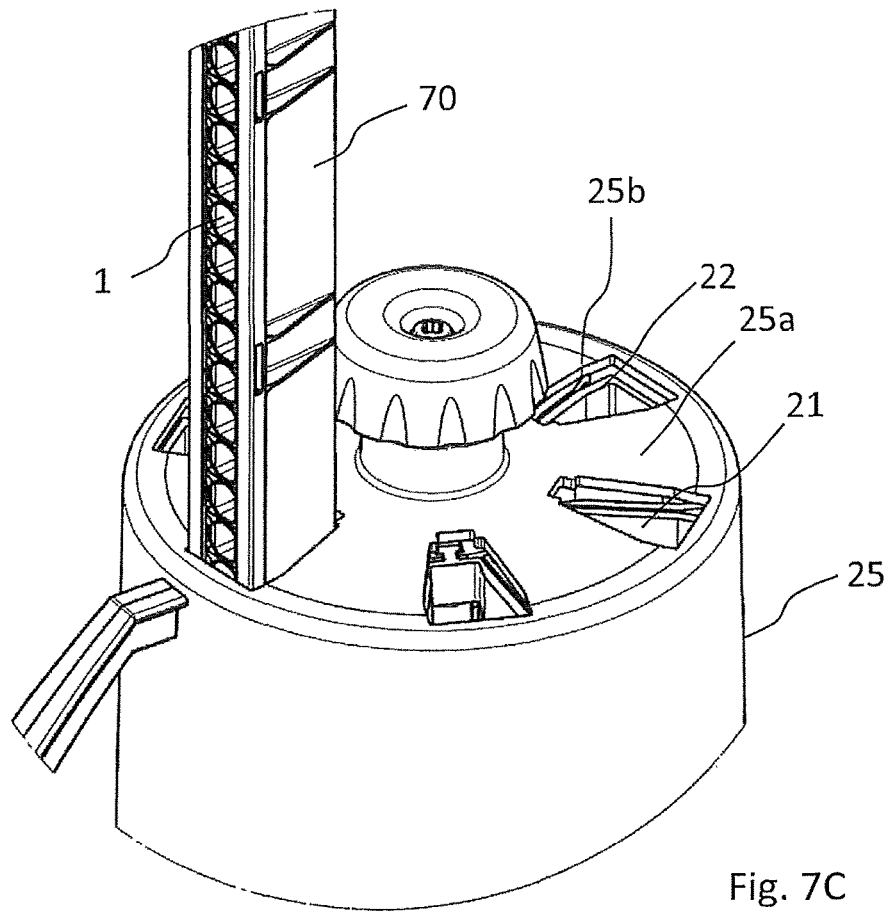
FIG. 7C illustrates a manual vessel cartridge plugged into a slot of the drum in the process of vessel loading according to an embodiment of the present disclosure.

FIG. 7C illustrates the manual vessel cartridge 70 of FIG. 7A plugged into an input interface 22 of a slot 21 of the drum 20 through an opening 25b of the housing 25 in the process of vessel loading. In particular, combining FIG. 7A with FIG. 7C, it becomes clear how the end 71 of the vessel cartridge 70 can be shaped such as to fit onto the input interface 22 of a slot 21 through an opening 25b. Upon plugging the cartridge 70, the resilient stack retainer 72 of FIGS. 7A-B can be biased by contact such as, for example, with the housing lid 25a or with the input interface 22 enabling the stack of vessels 1 to be loaded by gravity into the slot 21.

Figures 8A, 8B:
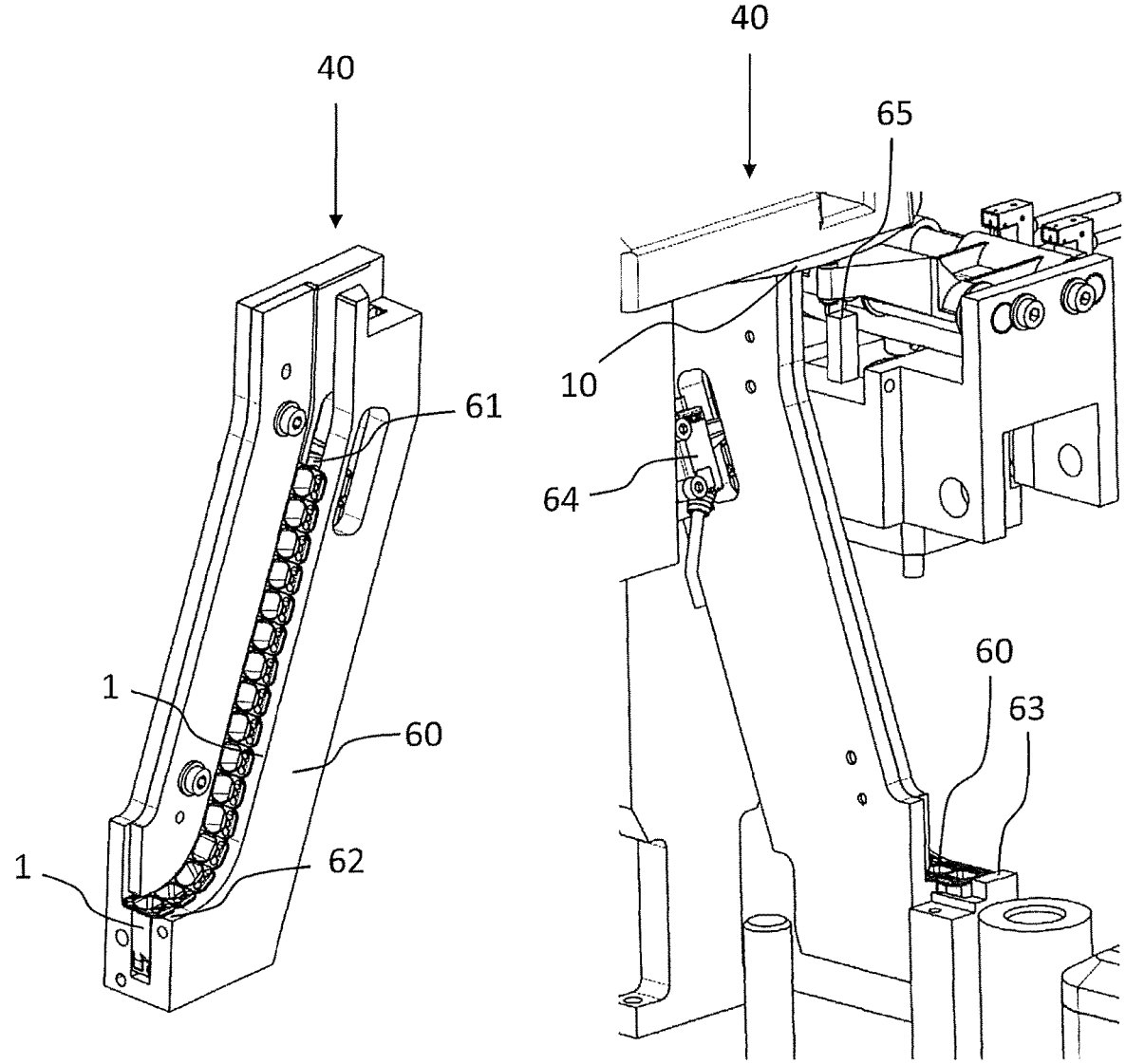
FIG. 8A illustrates a chute of a vessel dispensing system according to an embodiment of the present disclosure.
FIG. 8B illustrates the same chute of FIG. 8A from another perspective together with other details according to an embodiment of the present disclosure.

FIG. 8A and FIG. 8B illustrate in more detail and from different perspectives another element of the vessel dispensing system 100 of FIG. 1 and, in particular, the vessel receiving chute 60, arranged beneath the cam disc 10 in alignment with the vessel dispensing position 40. In particular, the chute 60 can comprise an inclined chute guide groove 61 terminating with a horizontal end portion 62, where a vessel stop 63 is located, so that vessels 1 being dispensed from a slot 21 may be stacked into the chute guide groove 61.

Coupled to the chute 60 can be a chute sensor 64 such as, for example, a light-barrier sensor, for monitoring if the number of vessels 1 in the chute falls below a threshold number before further vessels 1 are dispensed from a slot or before the drum is rotated to bring the next slot in the dispensing position.

The vessel dispensing system can further comprise a slot sensor 65 for detecting whether the slot next to the slot in the dispensing position is loaded with vessels or is empty, before the drum is rotated to bring the next slot in the dispensing position and for eventually triggering loading of vessels into the slots.

Figure 9:
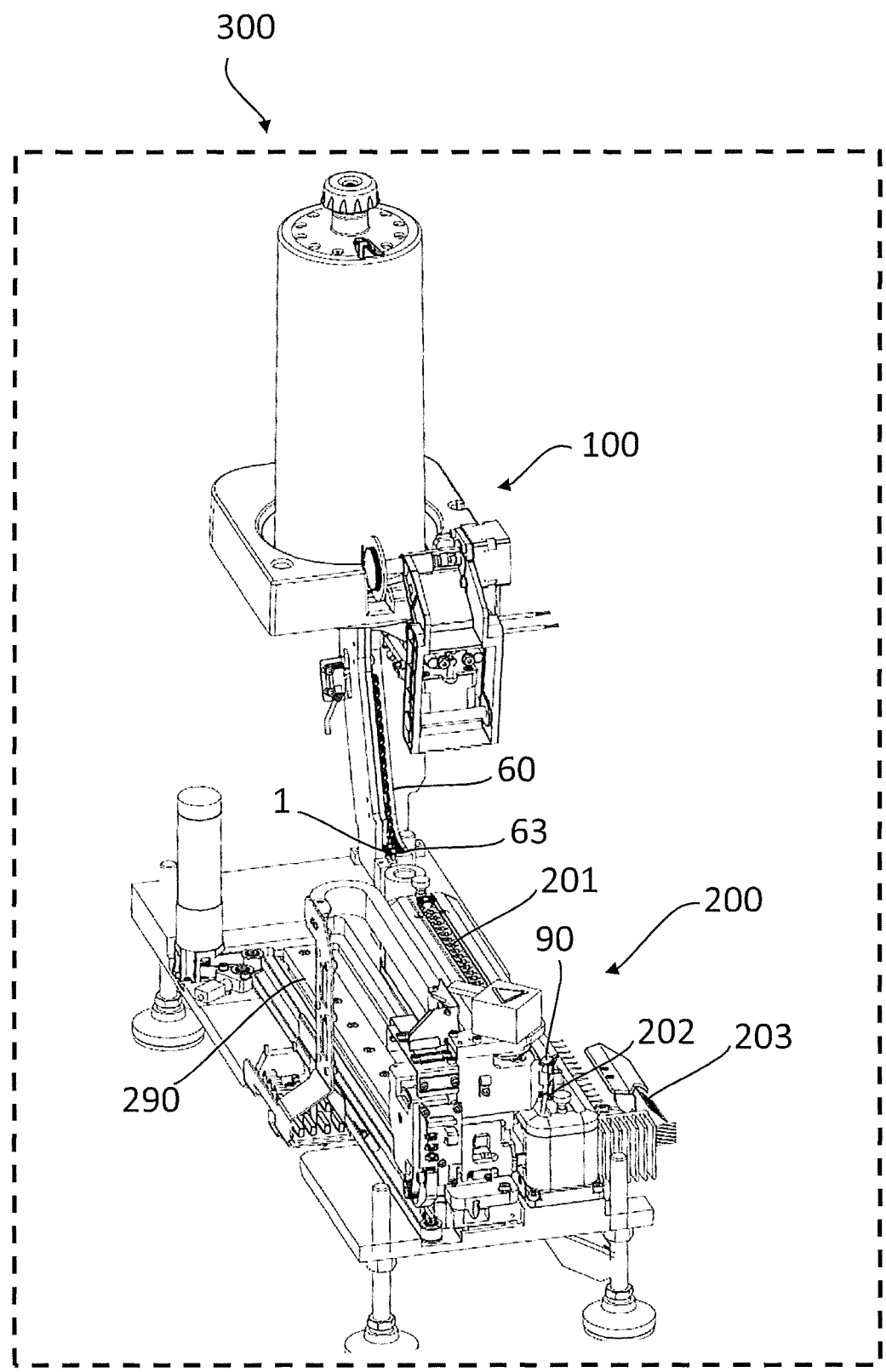
FIG. 9 illustrates schematically an automated in-vitro diagnostic system comprising an analyzer and a vessel dispensing system according to an embodiment of the present disclosure.

FIG. 9 illustrates schematically an automated in-vitro diagnostic system 300 comprising an analyzer 200 and a vessel dispensing system 100 like that of FIG. 1 for carrying out analytical tests with the use of the vessels 1.

The system can comprise a gripper 90, movable along guide rail 290 for picking one vessel 1 at a time from the end position 63 of the chute 60 and moving the vessel 1 to an incubation position 201 of the analyzer 200 that also acts as a pipetting position for a sample and/or a reagent to be dispensed therein, before being further moved to a detection position 202, where a detection is carried out such as, for example, by an optical detector 203.

Reference throughout the preceding specification to "one embodiment", "an embodiment", "one example" or "an example", can mean that a particular feature, structure or characteristic described in connection with the embodiment or example can be included in at least one embodiment. Thus, appearances of the phrases "in one embodiment", "in an embodiment", "one example" or "an example", in various places throughout this specification are not necessarily all referring to the same embodiment or example.

Furthermore, the particular features, structures, or characteristics may be combined in any suitable combinations and/or sub-combinations in one or more embodiments or examples.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A vessel dispensing system for dispensing vessels to an analyzer, the vessel dispensing system comprising:
   a cam disc rotatable about an axis and comprising a guide groove;
   a drum arranged above the cam disc and coupled to the cam disc such as to be rotatable together with the cam disc about the same axis, the drum comprising a plurality of elongated slots arranged along and around the axis, each slot comprising, at one end, an input interface for loading the slot with a plurality of vessels in a stacked manner and, at another end, an output interface for dispensing the vessels from the slot, the output interface comprising a resilient vessel retainer; and
   a crank translatable in a linear forwards and backwards direction orthogonal to the cam disc axis between a first, a second and a third position, the crank comprising a drive pin slidable through the guide groove for rotating the cam disc and bringing a slot at a time in a dispensing position upon translation of the crank between the first position and the second position, the crank further comprising an actuator pin translatable with respect to the drive pin for actuating the resilient vessel retainer of the output interface of the slot in the dispensing position upon translation of the crank between the second position and the third position, thereby allowing the vessels to be dispensed from the slot.

2. The vessel dispensing system according to claim 1, wherein the cam disc comprises through passages aligned respectively with the output interfaces of the slots for allowing the vessels of the slot in the dispensing position to pass through the respective passage when the crank is in the third position.

3. The vessel dispensing system according to claim 1, further comprising,
   a vessel distributor to release individual vessels one at a time from the stack of vessels in the slot, the vessel distributor being pivotally coupled to the crank such as to come in contact or out of contact with the stack upon translation of the crank between the second position and the third position.

4. The vessel dispensing system according to claim 3, wherein the vessel distributor comprises a rotatable brush.

5. The vessel dispensing system according to claim 1, further comprising,
   a drum-holding housing wherein the drum is rotatable with respect to the housing.

6. The vessel dispensing system according to claim 5, wherein the drum-holding housing comprises a grip for manually gripping the housing and enabling separation of the housing and of the drum contained therein from the vessel dispensing system.

7. The vessel dispensing system according to claim 6, further comprising,
   a housing-lock mechanism for fixing and locking the housing with respect to the vessel dispensing system.

8. The vessel dispensing system according to claim 7, wherein the crank comprises a lever arm for locking/unlocking the housing-lock mechanism upon translation of the crank between the first position and the second position or the third position.

9. The vessel dispensing system according to claim 7, wherein the grip is part of the housing-lock mechanism.

10. The vessel dispensing system according to claim 1, further comprising, a separate manual vessel cartridge loaded with a stack of vessels and configured to be plugged at one end into the input interface of the slot, the cartridge comprising a resilient stack retainer that is biased upon plugging into the input interface thereby enabling the stack of vessels to be loaded by gravity into the slot.

11. The vessel dispensing system according to claim 1, further comprising, a vessel receiving chute arranged beneath the cam disc in alignment with the vessel dispensing position such as to receive and stack by gravity the vessels being dispensed from the slot.

12. The vessel dispensing system according to claim 11, further comprising, a gripper for picking one vessel at a time from the chute and moving the vessel to an analyzer.

13. The vessel dispensing system according to claim 11, further comprising, a chute sensor for monitoring if the number of vessels in the chute falls below a threshold number before further vessels are dispensed from a slot or before the drum is rotated to bring the next slot in the dispensing position.

14. The vessel dispensing system according to claim 1, further comprising, a slot sensor for detecting whether a selected slot next to the slot in the dispensing position is loaded with vessels or is empty, before the drum is rotated to bring the selected next slot in the dispensing position and for triggering loading of vessels into the slots.

* * * * *